March 17, 1942.     R. W. COX     2,276,373
ADJUSTABLE VEHICLE SEAT FRAME
Filed Feb. 17, 1940     3 Sheets-Sheet 1

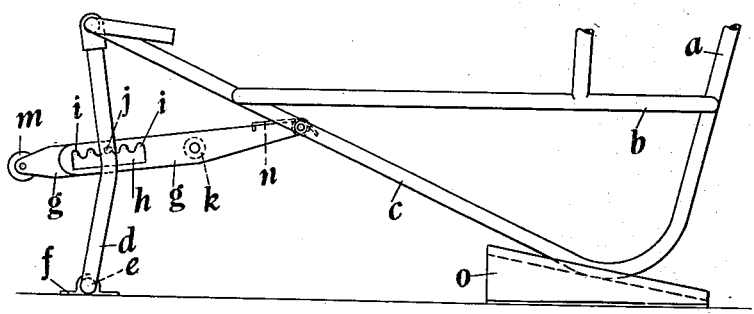
Fig.3
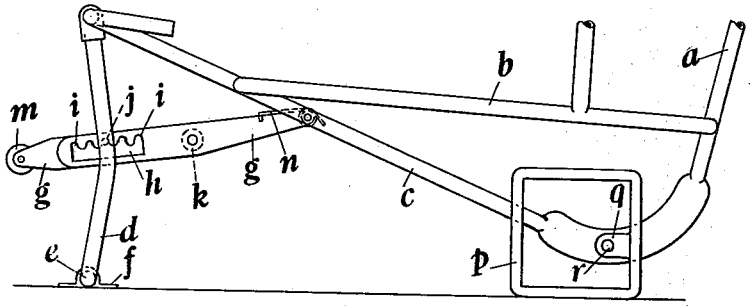
Fig.4
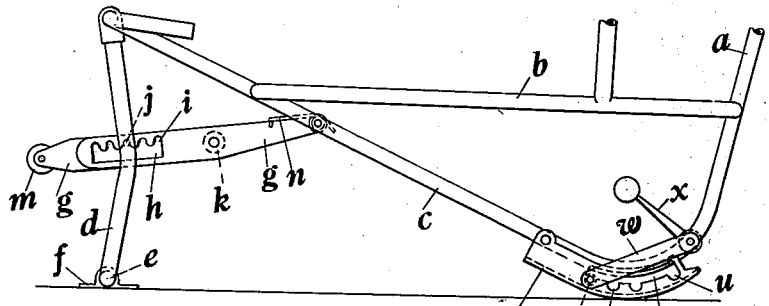
Fig.5
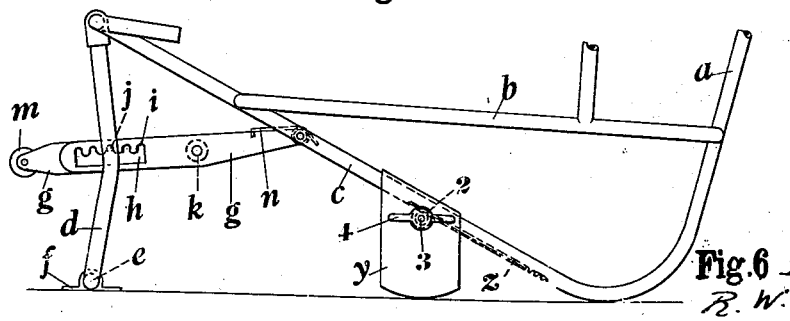
Fig.6 Inventor,
R. W. Cox
By: Glascock Downing & Seebold
Attys.

March 17, 1942.  R. W. COX  2,276,373
ADJUSTABLE VEHICLE SEAT FRAME
Filed Feb. 17, 1940   3 Sheets-Sheet 3

UNITED STATES PATENT OFFICE 2,276,373

ADJUSTABLE VEHICLE SEAT FRAME

Rowland Wilton Cox, Bushey, England

Application February 17, 1940, Serial No. 319,542
In Great Britain February 17, 1939

5 Claims. (Cl. 155—14)

This invention has for its object to provide improved horizontally adjustable vehicle seat frames.

In the accompanying sheets of explanatory drawings:

Figures 3 to 9 are similar views to Figure 1 illustrating respectively seven different modes of varying the height of the rear part of the seat frame.

Figure 1:
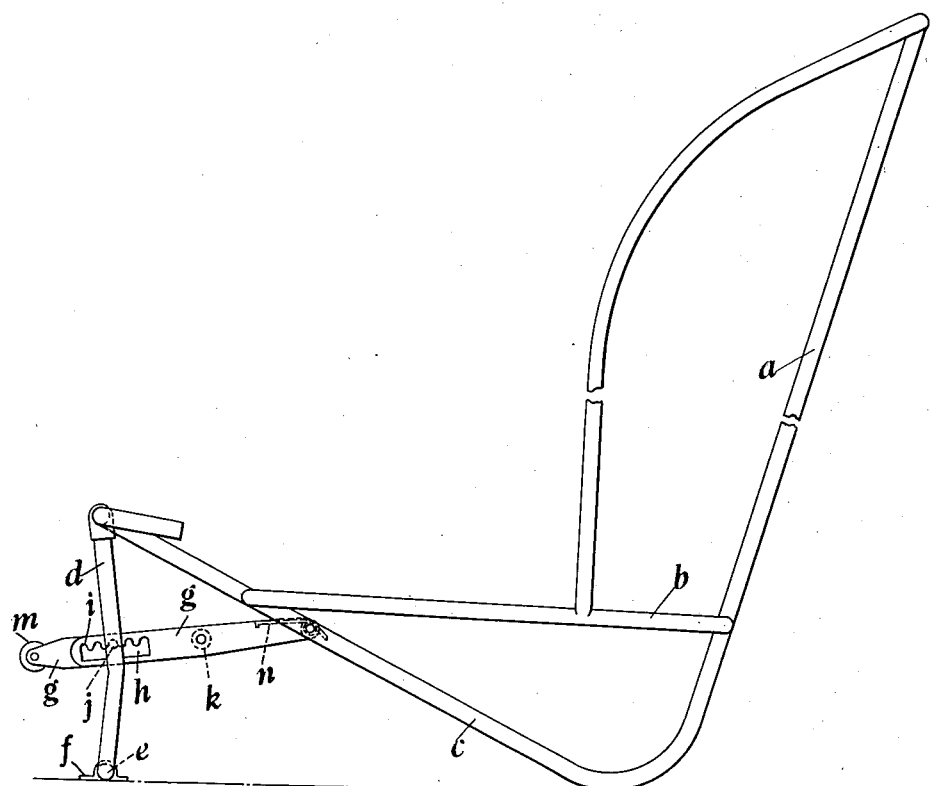
Figures 1 and 2 are respectively a side elevation and a plan of a seat frame provided with the invention.
Figure 2:
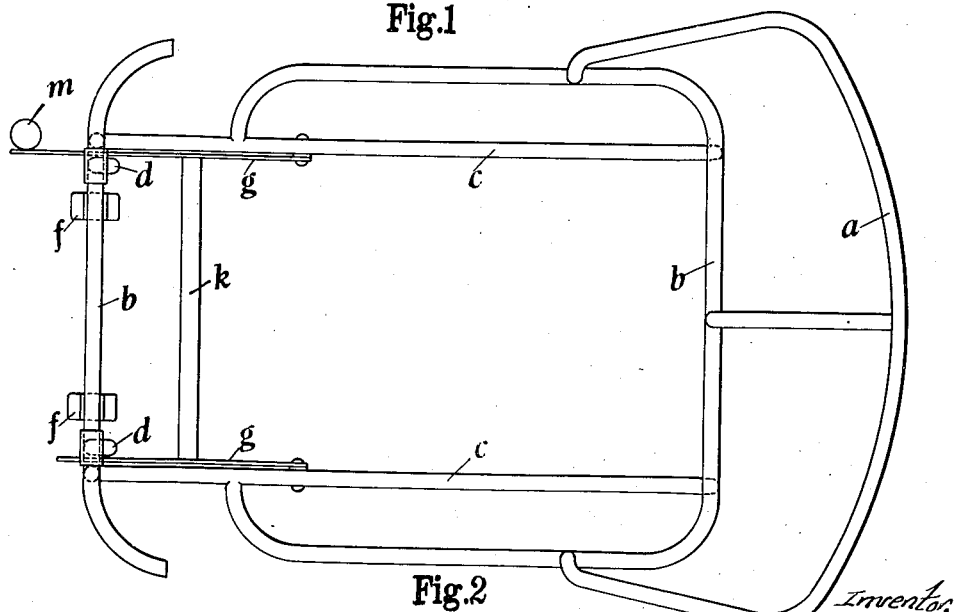

In carrying the invention into effect as shown in Figures 1 and 2, the frame is constructed from tubular or other metal members shaped to provide a back rest $a$ and a seat or a part or parts as $b$ for supporting a seat or seat cushion. At or near each side the frame is formed or provided with an obliquely arranged member $c$ herein termed a runner having its front end at a higher level than its rear end or a part near its rear end. The rear end or part near the rear end of each runner $c$ is adapted to rest and slide on the floor, or on a fitting or fittings on the floor. At a position adjacent to each runner $c$ the front part $b$ of the seat frame has attached to it a leglike support $d$, the upper end of the latter being pivotally attached to the front part $b$ and the lower end adapted to be pivotally attached to the floor or to a fitting adapted to be secured to the floor. The two leg-like supports $d$ may conveniently and as shown be formed integrally with the ends of a horizontal cross bar $e$ adapted to be pivotally attached to the floor by clip-like fastenings $f$.

To secure the frame $a$, $b$, $c$ and one or both of the leg-like supports $d$ together in a manner which permits of easy adjustment of the frame relatively to the floor, I employ a pair of links $g$ which are arranged one adjacent to each leglike support $d$, and which are provided with slots $h$. Each link $g$ is pivotally attached at one end to for example the adjacent runner $c$, and one edge of its slot $h$ is provided with a series of notches $i$ with any one of which can be engaged a projection $j$ on the corresponding leg-like support $d$. Also the two links $g$ are interconnected by a transverse rod $k$, and the front end of one of the links is extended and provided with a handle or knob $m$ for enabling the links to be moved by hand. If desired one or each of the links $g$ may be loaded by a light spring $n$ for holding the links in engagement with the projections $j$.

To effect horizontal adjustment of the position to the above described seat frame when mounted on the floor of a vehicle, the links $g$ are released from their engaging projections $j$ and the seat frame is then moved backwards or forwards as desired. In this movement the lower parts of the runners $c$ slide relatively to the floor and each leg-like support $d$ rocks about its pivotal connection with the floor. After the adjustment has been made the links $g$ are re-engaged with the projections $j$ for securing the frame against accidental movement. Instead of employing a pair of links $g$ as above described only one such link may be used.

In the case where the rear end, or a part near the rear end, of each runner $c$ is adapted to rest and slide on a fitting on the floor, this fitting may have the form of a ramp $o$ as shown in Figure 3. The upper surface of the ramp $o$ is shaped to provide an inclined guide for the adjacent part of the runner so that horizontal adjusting movement of the seat frame is accompanied by vertical adjustment of the rear part of the frame.

Alternatively any other convenient means may be employed for effecting vertical adjustment of the rear part of the frame, six different forms of such means being illustrated in Figures 4 to 9 respectively.

In the example shown in Figure 4, each runner $c$ is supported near its rear end by a rectangular or other polygonal frame $p$ which is slidable on the floor. This frame $p$ is provided with an inwardly extending lug $q$ to which the runner $c$ is connected by a pivot $r$, the latter being spaced by a different distance from each side of the polygonal frame. By turning the frame $p$ about the pivot $r$ to bring different sides of the frame into contact with the floor, the height of the rear part of the seat frame can be varied.

In the modification shown in Figure 5, each runner $c$ is supported by an arcuate member $s$ of channel form in cross section, this member being pivoted at one end to the runner, and being slidable on the floor. One or each side of this member $s$ is provided with a slot $t$ having along one edge a plurality of notches $u$ for alternative engagement by a projection $v$ on a lever $w$, the latter being pivoted to the runner $c$ at a position adjacent to the free end of the supporting member $s$, and being operable by a hand lever $x$. By bringing the projection $v$ into engagement with different notches $u$ the height of the rear part of the seat frame can be varied.

The example shown in Figure 6 is similar to that shown in Figures 1 and 2 insofar as the rear end, or a part near the rear end, of each runner *c* is adapted to slide on the floor. But each runner *c* has slidably mounted on it a supplementary support *y* which at its lower end is adapted to slide on the floor, and which can be adjusted along the obliquely arranged runner to move the latter out of contact with the floor and thereby vary the height of the rear part of the seat frame. For enabling the adjusting movement to be imparted to the supplementary support *y*, the runner *c* is formed or provided with a toothed rack *z* which is engaged by a pinion 2 on a rotatable spindle 3 carried by the support, an operating handle 4 being mounted on one end of the spindle.

Figure 7:
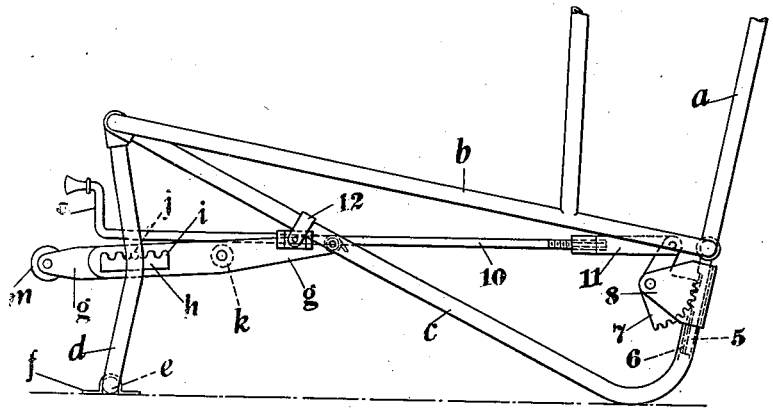

In the example shown in Figure 7, each runner *c* is pivoted at its front end to the seat-supporting part *b* of the frame, and has a telescopic connection at its upwardly extending rear end with a pivoted or other extension 5 depending from the rear part of the frame, the said extension being slidably adjustable in the adjacent end of the runner for varying the height of the rear part of the seat frame. For enabling the adjustment of the extension 5 to be effected it is formed or provided with a toothed rack 6 which is engaged by a toothed segment 7 passing through a slot in the rear end of the runner *c*. The segment 7 is pivotally supported by a bracket 8 on the rear end of the runner *c*, and is operable by a handle 9 on one end of a rotatable but axially immovable rod 10 which at its other end is in screw-thread engagement with a member 11 pivoted to an extension of the segment, the rod being carried by a bracket 12 on the runner *c*. By rotating the handle 9 the segment 7 is actuated, and by its interaction with the rack 6 causes the extension 5 to vary the height of the rear part of the seat frame.

Figure 8:
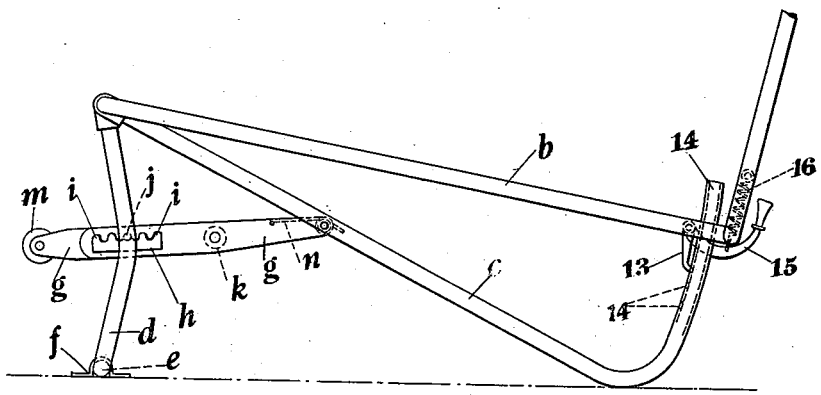

The modification shown in Figure 8 is similar to that shown in Figure 7 inasmuch as the front end of each runner *c* is pivoted to the seat-supporting part *b* of the frame. The rear upwardly extending end of each runner *c*, however, is adjustably connected to the rear end of the seat frame by a pawl 13 the latter being pivotally connected to the frame and being adapted to engage any of a plurality of holes 14 in the rear end portion of the runner. The pawl 13 is dis-engageable from the holes 14 by a hand lever 15 against the action of a loading spring 16. By moving the pawl 13 out of engagement with any one of the holes 14 and into engagement with another, the height of the rear part of the seat frame can be varied.

Figure 9:
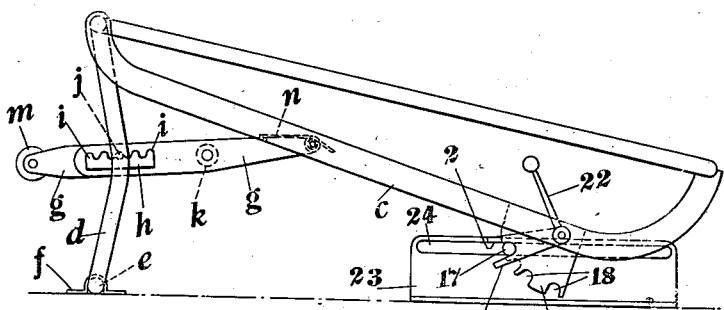

In the example shown in Figure 9, each runner *c* is slidably supported near its rear end by a member 23 adapted to be secured to the floor. This member 23 is provided with a horizontal slot 24 in which is slidable a cylindrical metal piece 17. This latter is alternatively engageable with a plurality of notches 18 in a segment 19 on the runner *c* for holding the rear part of the seat frame at different distances from the floor. Also the metal piece 17 extends through a V-shaped recess 20 in the outer end of a lever 21 which is pivoted to the runner *c*, and which is operable by a hand lever 22 for disengaging the said piece from the notches 18 in the segment 19.

The invention is not limited to the examples above described as subordinate details may be varied in a number of ways. For example instead of using two runners situated at or near the sides of the frame (though this is the preferred construction) a single runner situated centrally beneath the rear part of the frame may be used. Further when two runners are used, a single and centrally placed leg-like support may be provided at the front of the frame, though a pair of spaced supports is usually more satisfactory.

By this invention a horizontally adjustable seat frame is provided in a very simple and convenient form.

Having thus described my invention what I claim as new and desire to secure by Letters Patent is:

1. A horizontally adjustable vehicle seat frame having at its front at least one leg-like support pivotally attached at the upper end to the frame and adapted at the lower end to be pivotally supported on a fixed axis, the rear of the frame being adapted to be slidably supported, at least one notched link pivoted on the frame, and a part provided on the leg-like support and adjustably engageable by the notched link for securing the frame in desired positions.

2. A horizontally adjustable vehicle seat frame having at its front at least one leg-like support pivotally attached at the upper end to the frame and adapted at the lower end to be pivotally supported on a fixed axis, the rear of the frame being adapted to be slidably supported, at least one link provided with a plurality of notches and pivoted to one of the parts formed by the leg-like support and frame, and a projection provided on the other of the said parts and engageable by the notches in the link for securing the frame in different positions.

3. A horizontally adjustable vehicle seat frame consisting in part of at least one downwardly inclined member extending from the front to the rear of the frame and adapted to be slidably supported at the lower end, at least one leg-like support arranged at the front of the frame and pivotally attached at its upper end to the frame, the said leg-like support being adapted at its lower end to be pivotally supported on a fixed axis, a link provided with a plurality of notches and pivoted to one of the parts formed by the said inclined member and leg-like support, and a projection provided on the other of the said parts and engageable by the notches in the link for securing the frame in different positions.

4. A seat frame as claimed in claim 2 and having mounted on the rear portion of the frame means for varying the height of the said portion of the frame.

5. A seat frame as claimed in claim 3 and having in combination with the rear portion of the frame, at least one slidable supporting member mounted on the inclined member of the frame, and rack and pinion mechanism for adjusting the position of the said supporting member on the said inclined member and thereby varying the height of the said portion of the frame.

ROWLAND WILTON COX.